United States Patent [19]

Lang et al.

[11] E Re. 30,846

[45] Reissued Jan. 12, 1982

[54] SUBMARINE PIPELINE LAYING VESSEL

[75] Inventors: Alexander C. Lang, Henly on Thames, England; Peter A. Lunde, Houston, Tex.

[73] Assignee: Santa Fe International Corporation, Orange, Calif.

[21] Appl. No.: 944,979

[22] Filed: Sep. 22, 1978

Related U.S. Patent Documents

Reissue of:

[64] Patent No.: 3,982,402
Issued: Sep. 28, 1976
Appl. No.: 574,433
Filed: May 5, 1975

[51] Int. Cl.[3] ..... F16L 1/00; B63B 35/04; B65H 75/00

[52] U.S. Cl. ..... 405/168

[58] Field of Search ..... 405/168, 166, 167, 170, 405/164; 72/161; 247/78.7, 54, 157.1

[56] References Cited

U.S. PATENT DOCUMENTS

| | | | |
|---|---|---|---|
| 1,537,942 | 5/1925 | Howard | 242/157.1 |
| 3,405,878 | 10/1968 | Lawrence | 242/54 R |
| 3,581,506 | 6/1971 | Howard | 405/166 |
| 3,641,778 | 2/1972 | Gibson | 405/168 |
| 3,685,306 | 8/1972 | Mott | 405/168 |
| 3,775,985 | 12/1973 | Shaw | 405/166 |
| 3,822,559 | 7/1974 | Matthews | 405/168 |
| 3,872,680 | 3/1975 | Nicholson et al. | 405/168 |

*Primary Examiner*—Dennis L. Taylor
*Attorney, Agent, or Firm*—LeBlanc, Nolan, Shur & Nies

[57] ABSTRACT

This invention relates to a method and to an apparatus for use in laying a submarine pipeline from a pipe-laying vessel. According to one aspect of the present invention, there is provided a reel pipe-laying method for continuously laying a pipeline of up to 24-inch diameter without a stinger by (1) aligning a pipe portion as it is being paid out from the reel, (2) straightening the aligned pipe portion, (3) tensioning the pipe, (4) discharging the straightened pipe under tension into the body of water, and (5) changing for different water depths and pipe conditions the lift off angle of the pipe relative to the horizontal by pivoting a diverter about a horizontal pivot, the diverter supporting at least the straightener and the tensioner and extending from the horizontal pivot mounted near the aft end of the vessel, upwardly toward the reel.

25 Claims, 2 Drawing Figures

10
11
12
13
15
16
18
19
20
21
24
26
27
32
34
35
36
42
44
48
50
51
52
53
54
A 10
14
16
18
21
24
26
28
30
35
36
42
44
51

SUBMARINE PIPELINE LAYING VESSEL

Matter enclosed in heavy brackets [ ] appears in the original patent but forms no part of this reissue specification; matter printed in italics indicates the additions made by reissue.

BACKGROUND OF THE INVENTION

The laying of long lines of metal pipe on the floor of deep waters from a lay barge is gaining increasing commercial importance for the transport of fluids, particularly petroleum and petroleum products.

In one conventional, pipe-laying method, known as "stove-piping", a pipeline is fabricated on the deck of a lay barge by welding together individual lengths of pipe. Each length of pipe is about 40 feet long. In another conventional method, known as "the reel pipe-laying technique" for laying relatively smaller diameter pipe, a pipeline is wound on the hub of a large reel which is rotatably mounted on the deck of the lay barge. The lay barge is then moved to an offshore pipe-laying location and the pipeline is unwound from the reel. The unwinding portion of the pipeline is straightened prior to being lowered into the body of water. In both of these techniques the departure angle of the pipe relative to the barge is limited primarily due to the fixed location of the pipe handling machinery mounted on the deck of the barge.

In either of these known pipe-laying methods, the lay barge is required to have a long equipment ramp in a position fixed relative to the barge. In one procedure there are mounted on the ramp a plurality of longitudinally-spaced pipe supports, commonly known as stanchions. The position of each stanchion is adjustable within a small range to provide a desired pipe-descent trajectory which gradually slopes downwardly. A particular trajectory is selected for each diameter size of pipe, weight of pipe, pipe tension, and depth of water. In another procedure the means of supporting the pipe is what is commonly known as a "stinger", which is attached to the aft end of the lay barge at the end of the long ramp. The stinger supports the descending pipe span from the aft end of the barge to a lift-off point on the stinger. From this lift-off point the pipe span can safely sag to the seabed. The primary purpose of the stinger is to avoid excessive concentrations of curvature stress in the descending pipe span. These concentrations could buckle or permanently bend the pipeline. Various types of pipe stingers are known; some are straight and others have articulated joints.

A straight stinger is usually a long, stiff structure. It comprises two buoyant pontoons interconnected by numerous crossovers on which are mounted horizontally and vertically disposed rollers. The rollers support the pipe span as it moves from the barge's aft end to the lift-off point. However, straight stingers have several disadvantages, for example, significantly different water depths require stingers of different lengths. The changing of stingers is time-consuming. The length of a straight stinger is generally from four to six times the water depth in which the pipeline is laid. In practice, however, stingers have an upper length limit of about 600 feet. Such long stingers must be capable of withstanding high loads caused by water currents and relative movement between the stinger and the lay-barge.

Stingers are therefore generally constructed from high-strength materials, for example high-strength steel.

Some of the disadvantages of a straight stinger are avoided by using a freely-articulated stinger consisting of several segments connected in series by hinge joints. While a freely-articulated stinger is designed to follow the curvature of the descending pipe span, destructive concentrations of pipe curvature stress can occur along the stinger, if the buoyancy of the segments is not correctly distributed. Wave motions and pitching motions of the lay barge tend to cause the stinger to rise and fall in high seas, thereby making a pipe which extends between any two stinger segments very vulnerable to buckling.

A semi-articulated stinger has been proposed as a compromise between a freely-articulated stinger and a straight stinger. In the semi-articulated stinger, the segments are connected with hinge joints which permit a limited degree of vertical, lateral, and torsional intersegment movement.

Stingers usually require a significant amount of time to install, operate, and remove, especially during an impending storm or other adverse operating conditions. If a stinger fails during pipe-laying, the barge's down time can be great and the ensuing financial loss considerable.

In practicing the conventional pipe-laying methods hereinbefore described the pipeline moves over the deck of the lay barge in a substantially horizontal plane. Long ramps are required on the lay barges and frequently these ramps do not provide adequate space for inspecting, testing and, if necessary, repairing the descending pipeline. Also, workers find it difficult to maintain their equilibrium on the ramp, especially in rough sea.

Proposals have been made to solve the "stinger problem" by eliminating the stinger. But these proposals, as far as is known, have been limited to the reel pipe-laying technique for up to 12 inch pipe, as described in U.S. Pat. No. 3,641,778, assigned to the same assignee.

SUMMARY OF THE INVENTION

According to one aspect of the present invention, there is provided a reel pipe-laying method for continuously laying a pipeline without a stinger by aligning a pipe section as it is being paid out from the reel, straightening the aligned pipe, tensioning the pipe, discharging the straightened pipe under tension into the body of water, and changing the lift off angle of the pipe relative to the horizontal by pivoting a diverter structure operably supporting at least the straightener and tensioner, but preferably the aligner as well. The diverter extends from a horizontal pivot, near the aft end of the vessel, upwardly and inwardly toward the reel.

Generally, the lift-off angle of the straightened pipe relative to the horizontal, i.e., the deck of the ship, and the tension applied thereon are adjusted according to the depth of the body water into which the pipeline is discharged, and to the size, strength and weight of the pipe.

The present invention has the unique advantage for both small and large diameter pipe in that lift off angles of up to 90° can be easily achieved under continuous pipe-laying operation.

The pipe-laying vessel has a pipe supply reel which is rotatably mounted about a horizontal axis oriented athwartships. The reel is comprised of a hollow hub, mounted on the ship for rotation about its horizontal axis, and of vertically disposed side flanges secured respectively about the opposite ends of the hub. Bearing means are provided for rotatably supporting and centering the hub. Drive means are circumferentially mounted about the bottom portions of a flange for rotating the reel clockwise or counterclockwise.

A diverter is provided for guiding a pipe section from its orientation as it unwinds from the reel toward a downwardly extending orientation, as the pipe is being guided between the reel and the body of water. The diverter is pivotably mounted on and preferably near the aft end of the vessel about a horizontal pivot whereupon it extends over the vessel's deck in an upward direction inclined toward the reel.

The diverter preferably comprises near its upper end a curved aligner for changing the orientation of the pipe from its orientation as it unwinds from the reel into a downwardly-extending, vertical trajectory toward the body of water. The aligner is followed by bending means for plastically reverse-bending the pipe to a desired, preferably linear, configuration after the pipe leaves the bending means. The bending means may include or be followed by tension means for applying tension to the pipe.

Advantageously, the aligner, the straightener, and the tensioner are mounted on the diverter structure for pivotal movement therewith. The straightener and tensioner can employ common elements, all of which are preferably arranged to permit adjustable angular and reciprocating movements therebetween.

A reel with the largest pipe storage capacity is ordinarily employed. This requires a reel having a hub with a minimum outer diameter determined so as not to adversely affect the largest diameter pipe which will be coiled on the reel. The pipe is bent around the reel's hub so that the maximum stress in at least a portion of the pipe's metal wall exceeds the yield stress.

When a straight metal pipe is bent to a bending radius known as the critical radius, the pipe is said to be at the limit between its elastic or linear range and its plastic or non-linear range.

If a straight pipe is bent elastically, that is, so as not to exceed its elastic range, no residual deformation or curvature remains in the pipe after the applied bending moment is removed. A straight pipe therefore is a pipe with zero curvature, or a pipe bent to an infinite radius. For each steel grade and diameter size pipe, there corresponds a critical bending radius whose value marks the boundary between the pipe's elastic and plastic ranges.

In the pipe's plastic range, the stress-strain relationship is non-linear. For a relatively small increase in bending moment applied to the pipe, there is now obtained a relatively large increase in curvature. A permanent residual curvature will now remain after the release of an applied bending moment. If such a permanent deformation is not objectionable, the pipe can be bent plastically to a limit of the ultimate bending radius. If now the bending radius is made smaller than the pipe's ultimate bending radius, the pipe is likely to buckle and collapse.

For example, for a typical 8-inch diameter steel pipe whose steel has a yield strength of 35,000 psi, the critical elastic bending radius is about 308 feet. That is, if the pipe is bent to a radius larger than 308 feet, there will remain no appreciable residual curvature in the pipe upon the release of the bending moment. If it is necessary to bend the same pipe to a radius considerably shorter than 308 feet, the pipe's steel can be bent plastically, without exceeding its ultimate bending moment, down to a radius of about 12 feet. If now the plastic bending moment is released, the pipe will remain with a permanent residual curvature.

For each grade of steel and diameter size, the values of the critical bending radius and of the ultimate plastic bending radius can be experimentally and theoretically determined. Accordingly, from a knowledge of such values, the necessary elements which are to be mounted on the pivotable diverter structure can be designed and controlled.

For a better understanding of the present invention and to show how the same may be carried into effect, reference will now be made, by way of example, to the accompanying drawings.

Figure 1:
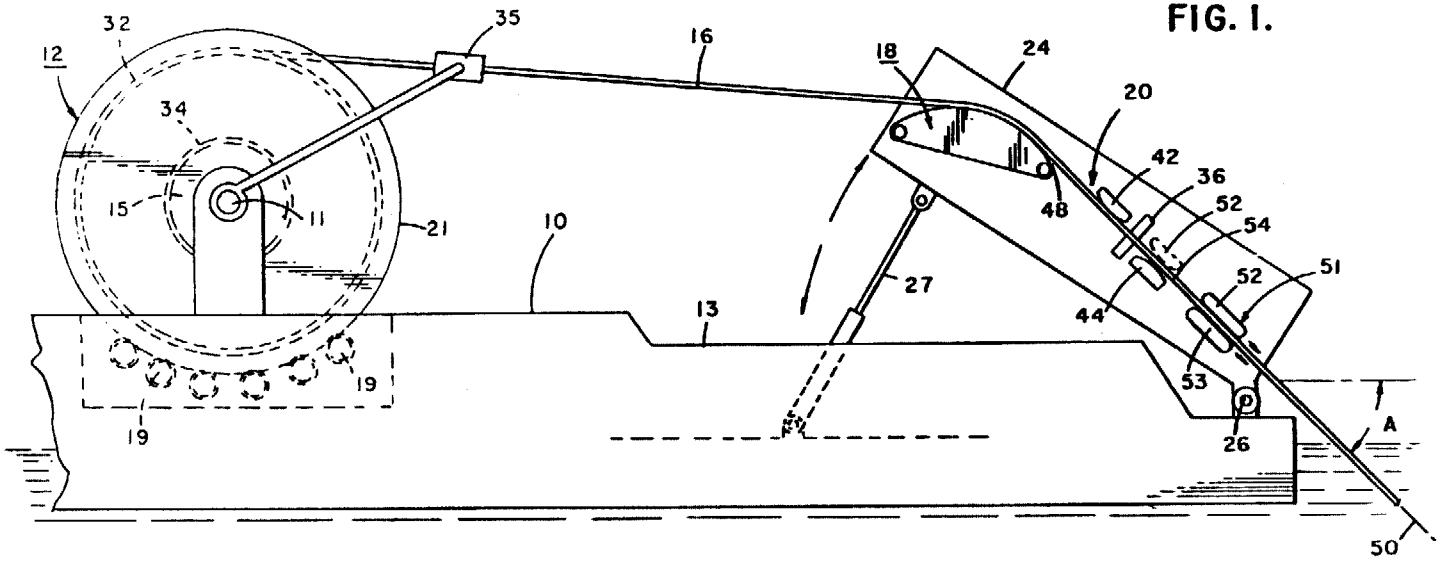
FIG. 1 is a schematic view in elevation of a preferred embodiment of an apparatus in accordance with the present invention.
Figure 2:
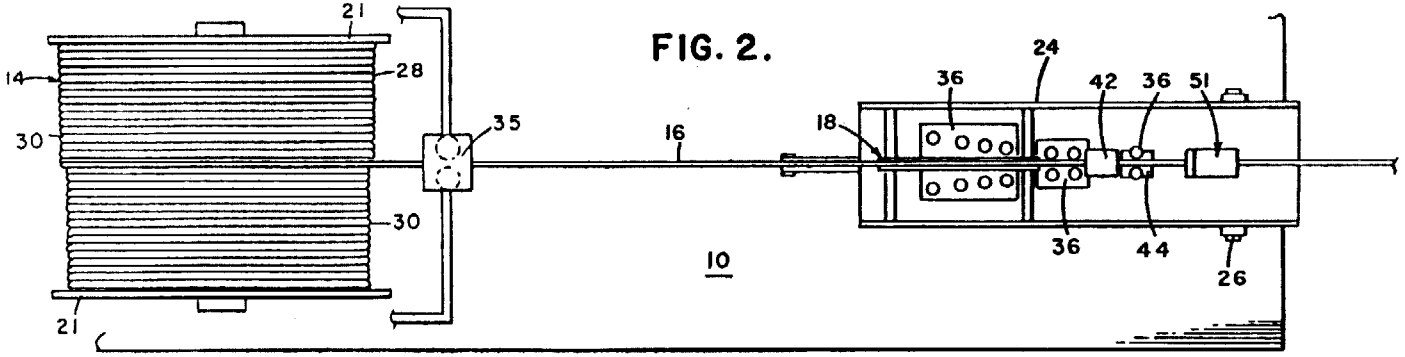
FIG. 2 is a plan view of the apparatus shown in FIG. 1.

Referring to the drawings, there is shown a pipe-laying ship 10 which supports a reel, generally designated as 12, on its deck 13. The hub 15 of reel 12 is shown disposed for rotation about its horizontal axis 11. Reel 12 stores a very long pipeline 14 which is wound into a multi-layer coil 28. Each layer of pipe 30 in the multi-layer coil 28 has many windings. The reel is driven clockwise or counterclockwise by a series of drive motors 19 operatively coupled for applying a driving force to one of the flanges 21 of the reel. When reel 12 is rotated clockwise, as viewed in FIG. 1, there is obtained an unwound pipe section 16.

The pipe section 16, when emerging from the outermost layer 32, has a relatively large radius of curvature and, conversely, when emerging from the innermost layer 34 has a smaller radius of curvature.

It has been found, contrary to what might be expected, that neither the pipe nor its plastic coating, if any, generally become damaged by the consecutive bending and reverse bending operations contemplated by the method of this invention.

It is desired for reel 12 to have a maximum pipe storage capacity. Hence, the diameter of hub 15 is selected so that even the largest diameter, say 24 inch, pipe wound thereon will not be bent to a radius shorter than its ultimate plastic bending radius, as previously defined.

The unwound pipe section 16 therefore contains a permanent residual curvature whose magnitude varies with the diameter of the layer in the multi-layer coil 28 from which pipe section 16 emerges; with the diameter, size, weight and strength of the pipe; with pipe tension; and with the angle to which a pipe diverter structure 24 has been elevated.

An aligner, generally designated as 18, bends pipe 16 from a generally horizontal direction to the desired downwardly extending orientation. Aligner 18 has a sufficiently small uniform or uniformly varying curvature to avoid buckling or damaging the pipe and is mounted near the top end of the diverter structure 24 whose bottom end is pivotably mounted for rotation about an athwartships horizontal pivot 26. The diverter can be rotated in a clockwise or counterclockwise direction and is supported at any selected angle by conventional extensible means 27 in order to set the lift-off angle A which is the angle between the descend trajectory of the pipe and the horizontal.

The diverter 24 also includes a pipe straightener which is generally designated as 20. Pipe section 16 enters the straightener at a variable angle with respect to the horizontal and with a variable residual curvature depending on the diameter of the layer in the multilayer coil 28 from which pipe section 16 emerges. The variable residual curvature also depends on the diameter, size, weight and strength of the pipe, upon pipe tension, and upon the angle A which the diverter has been elevated. Pipe straightener 20 plastically bends the pipe to a bending radius whose value is selected so as to straighten the pipe.

The required diverter elevation is determined by the depth of the body of water, the diameter and size of the pipe, the weight of the pipe, and the tension in the pipe at the water surface.

Pipe 16 after it leaves aligner 18 at a point 48, has a non-uniform residual stress distribution pattern relative to its longitudinal axis and, hence, a variable residual curvature.

To remove this variable residual curvature from pipe 16, straightener 20 is provided, for example, with a bending shoe 42 and a reaction shoe 44. Aligner 18 may serve as the other reaction shoe. The bending shoe 42, the reaction shoe 44, and the aligner 18 form a "three-wheeled straightener" whose operation is well known to those skilled in the art. The three-wheeled straightener plastically reverse bends the pipe by an amount sufficient to allow pipe section 16 to leave reaction shoe 44 at a point 54 with a very large radius of curvature which approaches infinity. A straight pipe is thus obtained.

From reaction shoe 44 pipe section 16 is discharged downwardly along a descent trajectory 50 and at the selected lift-off angle A with respect to the horizontal. Angle A may have a value from a few degrees up to 90°, which is an important advantage of this invention.

A level winding mechanism 35 is employed to guide pipe section 16 from the reel 12 as it uncoils across a pipe layer 30 to the center line of the diverter 24. The level winding force may be reacted against the reel's flanges 21. The pipe should be held straight in a vertical plane passing through the longitudinal axis of the diverter prior to its entering, and while passing across, the bending shoe 42. This is accomplished by a horizontal bending means 36 which can be adjusted to apply the necessary forces to the pipe normal to the vertical plane.

To assist in maintaining the descending pipe span under proper tension and to establish the proper catenary for the pipe in the body of water, there is additionally provided a pipe tensioner 51. While the tensioner can have independent elements 52, 53, the desired tension may be conveniently obtained by mounting only one tensioning shoe 52 (shown in dotted lines), face-to-face with the reaction shoe 44, with pipe 16 passing between the pipe-engaging peripheries of the opposite shoes 52 and 44. The tensioner shoes 52 and 44 or 52 53 firmly grip the pipe by the friction force between the shoe pads and pipe surface. Pipe tension is controlled by driving the shoes in the forward or reverse direction.

The various shoes are mounted at spaced locations on the diverter structure 24 and may be mounted for reciprocating and rotational movements relative to each other. The pipe-engaging periphery of each shoe preferably has a movable chain (not shown) made up of pipe-engaging pads that may be arcuately shaped to receive and closely engage against the wall of the moving pipe. The chains in the straightening and tensioning shoes move in directions indicated by the arrows.

The tensioner may be assisted by the ship's propulsion during the pipe-laying operation and/or by the reel's driving means 19.

What is claimed is:

1. A vessel for continuously laying a pipeline on the bed underlying a body of water, comprising:

a pipe supply reel mounted for rotation on said vessel about [its horizontal] *a predetermined* axis;

drive means for rotating said reel [thereby unwinding a pipe section];

a diverter structure having one end coupled to one end of said vessel and having the other end extending upwardly in the direction of said reel and at an acute angle relative to the deck of said vessel; and pipe-conditioning means mounted on said diverter structure for conditioning said pipe section and discharging the conditioned pipe section into said body of water.

2. The vessel of claim 1 and further including:

pivot means mounted near said one end of said vessel for pivotably mounting said one end of said diverter structure, and extensible means mounted on said vessel and being operably coupled to said diverter structure for pivoting said diverter structure about said pivot means, whereby said pipe is discharged directly from said one end of said vessel into said body of water.

3. The vessel of claim 2 and further including:

force-producing means positioned between said reel and said diverter structure for maintaining the unwound pipe section in a fixed vertical plane prior to and during the pipe conditioning.

4. The vessel of claim 3 wherein, said reel comprises a hollow hub and a pair of vertically-disposed side flanges secured to the opposite ends of said hub; and drive means angularly disposed under at least one of said flanges for rotating said reel.

5. A vessel for continuously laying a pipeline on the seabed underlying a body of water, comprising:

a pipe supply reel mounted for rotation on said vessel about its horizontal axis;

drive means for rotating the reel;

level winding means for level winding a pipe section as it is being pulled from the reel;

aligning means for aligning the pipe into a desired single vertical center plane;

straightening means for straightening the aligned pipe section;

diverter means;

said aligning means and said straightening means being mounted on said diverter means, and said diverter means being pivotably mounted on said vessel for changing the lift-off angle of the pipe relative to the horizontal, whereby said aligning and straightening means are positioned on and over the deck of said vessel; and means for discharging the straightened pipe under tension into said body of water at a desired lift-off angle.

6. The vessel of claim 5 wherein said aligning means are mounted on said diverter means between said straightening means and said reel.

7. The vessel of claim 6 and further including level-winding means mounted near the reel to guide the pipe laterally across the reel as the pipe is wound on and unwound from the reel.

8. The vessel of claim 7 and further including adjustable, horizontal-force-producing means positioned near the aligning means for maintaining the pipe in said vertical center plane prior to and during the straightening of the pipe by said straightening means.

*9. A vessel for laying a pipeline on the bed underlying a body of water, comprising:*

*a reel for carrying a continuous length of pipe spooled thereon mounted on said vessel for rotation about a predetermined rotational axis;*

*a diverter structure having one end portion mounted to said vessel and its other end portion extending upwardly at an acute angle relative to the deck of the vessel;*

*pipe conditioning means mounted on said diverter structure for conditioning pipe after it is unspooled from said reel and for discharging the conditioned pipe into said body of water; and*

*drive means for adjusting said diverter structure about its pivot axis to thereby selectively control the angle of discharge of said conditioned pipe into said body of water.*

*10. A vessel according to claim 9, wherein said pipe conditioning means comprises straightening means for bending the unspooled pipe to a bending radius whose value is selected to substantially straighten the pipe prior to its being discharged into the body of water.*

*11. A vessel according to claim 10, further including:*

*level winding means for guiding the pipe laterally across the reel as the pipe is unwound from the reel to said pipe conditioning means.*

*12. A vessel according to claim 11, wherein said level winding means is movable in a plane substantially normal to the rotational axis of the reel as pipe is unwound from the reel.*

*13. A vessel according to claim 9, wherein said diverter structure is pivotably mounted adjacent one end portion of said vessel; and said drive means comprises extensible means mounted on said vessel and operably coupled to said diverter structure for pivoting said diverter structure about said pivot means to a desired elevation as determined by the depth of the body of water and the diameter and size of the pipe.*

*14. A vessel according to claim 13, wherein:*

*said reel comprises a hollow hub and a pair of vertically-disposed side flanges secured to the opposite ends of said hub; and*

*further drive means are provided to cooperate with at least one of said flanges for rotating said reel.*

*15. A vessel according to claim 9, wherein said pipe conditioning means comprises:*

*aligning means for aligning the pipe in a desired substantially vertical plane; and*

*straightening means for straightening the aligned pipe section.*

*16. A vessel according to claim 15, wherein said diverter structure is pivotably mounted adjacent one end portion of said vessel; and said drive means comprises extensible means mounted on said vessel and operably coupled to said diverter structure for pivoting said diverter structure about said pivot means to a desired elevation as determined by the depth of the body of water and the diameter and size of the pipe.*

*17. A vessel according to claim 16, wherein said aligning means are mounted on said diverter means between said straightening means and said reel.*

*18. A vessel according to claim 17, further including:*

*level-winding means for guiding the pipe laterally across the reel as the pipe is wound on and unwound from the reel through said pipe conditioning means.*

*19. A vessel for laying a pipeline on the bed underlying a body of water, comprising:*

*a reel for carrying a continuous length of pipe spooled thereon mounted on said vessel for rotating about a predetermined rotational axis;*

*a diverter structure pivotably mounted to said vessel;*

*pipe conditioning means mounted on said diverter structure for conditioning pipe after it is unspooled from said reel and for discharging the conditioned pipe into said body of water, said pipe conditioning means including aligning means for aligning the unspooled pipe in desired plane, and straightening means for plastically bending the unspooled pipe to a bending radius whose value is selected to substantially straighten the pipe prior to its being discharged into the body of water;*

*level-winding means for guiding the pipe laterally across the reel as the pipe is unwound from the reel; and*

*drive means for pivoting said diverter structure about its pivot axis to thereby selectively control the angle of discharge of said conditioned pipe into said body of water.*

*20. A vessel according to claim 19, wherein said level-winding means is movable in a plane substantially normal to the rotational axis of the reel as pipe is unwound from the reel.*

*21. A vessel according to claim 19, wherein said diverter structure is pivotably mounted adjacent one end portion of said vessel; and said drive means comprises extensible means mounted on said vessel and operably coupled to said diverter structure for pivoting said diverter structure about said pivot means to a desired elevation as determined by the depth of the body of water and the diameter and size of the pipe.*

*22. A vessel according to claim 19, wherein said aligning means are mounted on said diverter means between said straightening means and said reel.*

*23. A vessel for laying a pipeline on the bed underlying a body of water, comprising:*

*a reel for carrying a continuous length of pipe spooled thereon mounted on said vessel for rotation about a predetermined rotational axis;*

*a diverter structure pivotably mounted to said vessel;*

*pipe conditioning means mounted on said diverter structure for conditioning pipe after it is unspooled from said reel and for discharging the conditioned pipe into said body of water, said pipe conditioning means including aligning means for aligning the unspooled pipe in a desired plane, and straightening means for plastically bending the unspooled pipe to a bending radius whose value is selected to substantially straighten the pipe prior to its being discharged into the body of water; and*

*drive means for pivoting said diverter structure about its pivot axis to thereby selectively control the angle of discharge of said conditioned pipe into said body of water.*

*24. A vessel according to claim 23, wherein said diverter structure is pivotably mounted adjacent one end portion of said vessel; and said drive means comprises extensible means mounted on said vessel and operably coupled to said diverter structure for pivoting said diverter structure about said pivot means to a desired elevation as determined by the depth of the body of water and the diameter and size of the pipe.*

*25. A vessel according to claim 23, wherein said aligning means are mounted on said diverter means between said straightening means and said reel.*

* * * * *

UNITED STATES PATENT AND TRADEMARK OFFICE

CERTIFICATE OF CORRECTION

PATENT NO. : Re.30,846

DATED : Reissued January 12, 1982

INVENTOR(S) : Lang et al.

It is certified that error appears in the above—identified patent and that said Letters Patent is hereby corrected as shown below:

Column 7, line 15, after "portion" insert --pivotably--.

Column 7, line 24, before "thereby" insert --predetermined elevation to--.

Column 8, line 15, before "desired" insert --a--.

Signed and Sealed this

*Twenty-sixth* Day of *October 1982*

[SEAL]

*Attest:*

GERALD J. MOSSINGHOFF

*Attesting Officer*

*Commissioner of Patents and Trademarks*